US 6,634,278 B2

(12) United States Patent
Bochart

(10) Patent No.: US 6,634,278 B2
(45) Date of Patent: *Oct. 21, 2003

(54) PISTON FOR AN INTERNAL COMBUSTION ENGINE AND METHOD OF ASSEMBLY

(75) Inventor: Michael R. Bochart, Delphi, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/037,147

(22) Filed: Dec. 21, 2001

(65) Prior Publication Data

US 2002/0056367 A1 May 16, 2002

Related U.S. Application Data

(63) Continuation-in-part of application No. 09/691,372, filed on Oct. 18, 2000, now Pat. No. 6,401,595.

(51) Int. Cl.$^7$ .............................................. F01B 31/08
(52) U.S. Cl. ............................................................. 92/186
(58) Field of Search ........................................... 92/186

(56) References Cited

U.S. PATENT DOCUMENTS

| | | | | | |
|---|---|---|---|---|---|
| 3,221,718 | A | * | 12/1965 | Isley | 92/224 |
| 4,377,967 | A | * | 3/1983 | Pelizzoni | 92/186 |
| 5,261,363 | A | * | 11/1993 | Kemnitz | 92/186 |
| 6,401,595 | B1 | * | 6/2002 | Bochart | 92/186 |

* cited by examiner

Primary Examiner—F. Daniel Lopez
(74) Attorney, Agent, or Firm—Keith P. Roberson

(57) ABSTRACT

Pistons for internal combustion engines often need additional cooling to attain better performance. One method of cooling involves adding oil to an oil gallery opposite a combustion zone. Adding a standpipe prevents a preestablished quantity of oil from exiting the oil gallery. Installing the standpipe intermediate a first baffle plate and a second baffle plate improves reliability of the piston and ease of manufacturing.

7 Claims, 4 Drawing Sheets

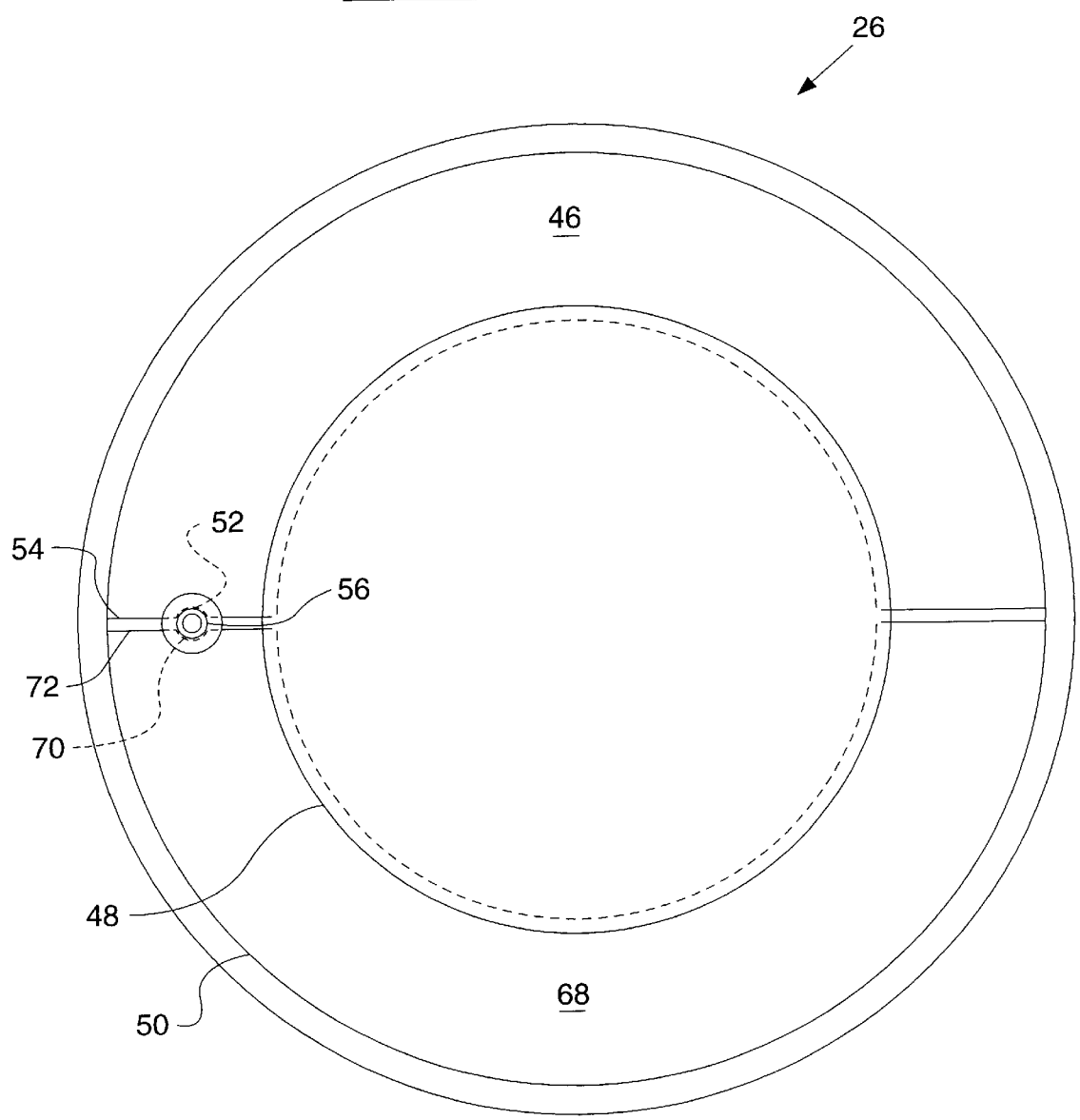

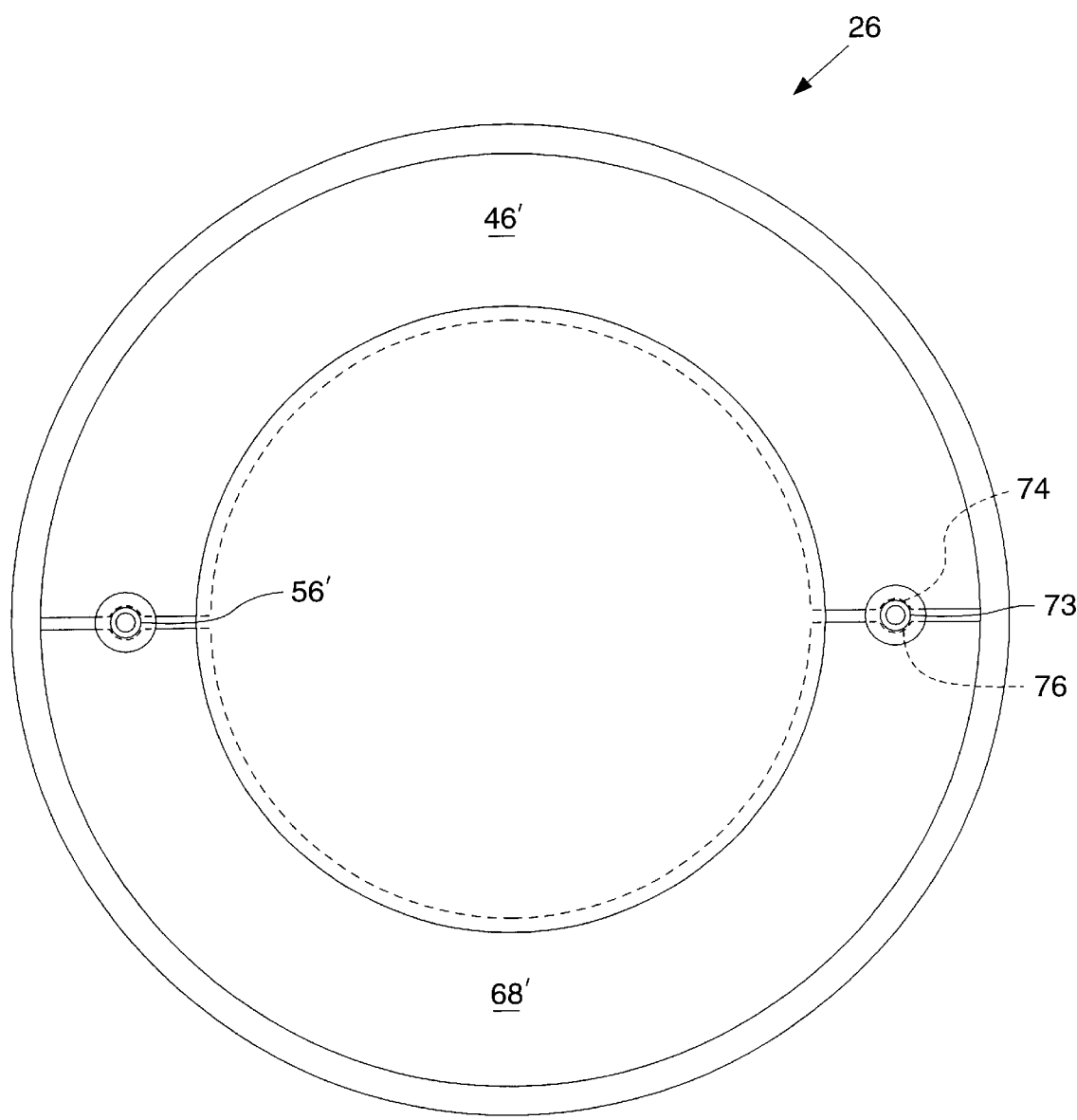

PISTON FOR AN INTERNAL COMBUSTION ENGINE AND METHOD OF ASSEMBLY

This application is a continuation-in-part of application Ser. No. 09/691,372, filed on Oct. 18, 2000, now U.S. Pat. No. 6,401,595.

TECHNICAL FIELD

This application relates to a piston for an internal combustion engine and more specifically to a piston and method of assembling the same.

BACKGROUND

Manufactures continually strive to increase efficiency of internal combustion engines while also decreasing the physical size of the engine. One way of improving efficiency and reducing size has been to increase temperatures and pressures in the combustion chamber while also increasing speeds of a piston reciprocating in an engine. Increased speeds, temperatures, and pressures to which the piston is subjected require improved cooling to maintain reliability and reduce wear of the piston.

Many pistons currently improve cooling through injecting oil or other coolants onto an underside of a piston head where the underside of the piston head is not subjected to a combustion environment. U.S. Pat. No. 5,144,922 issued to Lites et al on Sep. 8, 1992 shows a one piece spring plate along with the underside of the piston head forming a cooling gallery. In Lites, oil jets introduce oil into the cooling gallery through a first opening. Oil may exit through a second opening generally opposite the first opening. The spring plate allows oil to enter through the first opening and exit the second opening. Some oil collects in the cooling gallery. As collected oil moves in response to reciprocating of the piston, heat from the piston transfers into the oil and reduces the temperature of the piston.

U.S. Pat. No. 4,986,167 issued to Stratton et al on Jan. 22, 1991 similarly improves cooling similar to Leites by introducing oil into a cooling gallery. A standpipe allows cooling oil into the cooling gallery and acts as a dam to retain oil in the cooling gallery. The oil travels to an oil outlet opposite the standpipe. Unlike Lites, a coolant may not immediately exit the cooling gallery because the standpipe.

Reliably installing the standpipe in the spring plate is critical to keeping sufficient coolant in the cooling gallery. One method of intalling the standpipe involves installing the spring plate in the piston and later installing the standpipe. This method requires a mechanical locking mechanism sufficiently robust to withstand vibration, inertia loads, and temperature loading present in a combustion chamber.

The present invention is directed to overcoming one or more of the problems as set forth above.

SUMMARY OF THE INVENTION

In one aspect of the present invention a method of assembling a piston includes connecting a baffle plate between said inner surface of a outer annular wall and an inner surface of an inner annular portion. A standpipe is positioned proximate a first end portion of the baffle plate. The standpipe is secured between the first end portion of the first baffle plate and a first end portion of a second baffle plate.

In another aspect of the present invention a piston has an outer annular wall with an inner surface. An inner annular portion radially inward from the outer annular wall extends axially from a top portion and has an inner surface. A first baffle plate extends between the inner surface on the inner annular bowl and the inner surface on the outer annular wall. Also, a second baffle plate extends between the inner surface on the inner annular portion and the inner surface of the outer annular wall. A standpipe is positioned between the first baffle plate and the second baffle plate.

BRIEF DESCRIPTION OF THE DRAWINGS

FIG. 4 shows a bottom view of the piston; and

FIG. 5 shows a bottom view of the piston having an alternate embodiment of the present invention.

DETAILED DESCRIPTION

Figure 1:
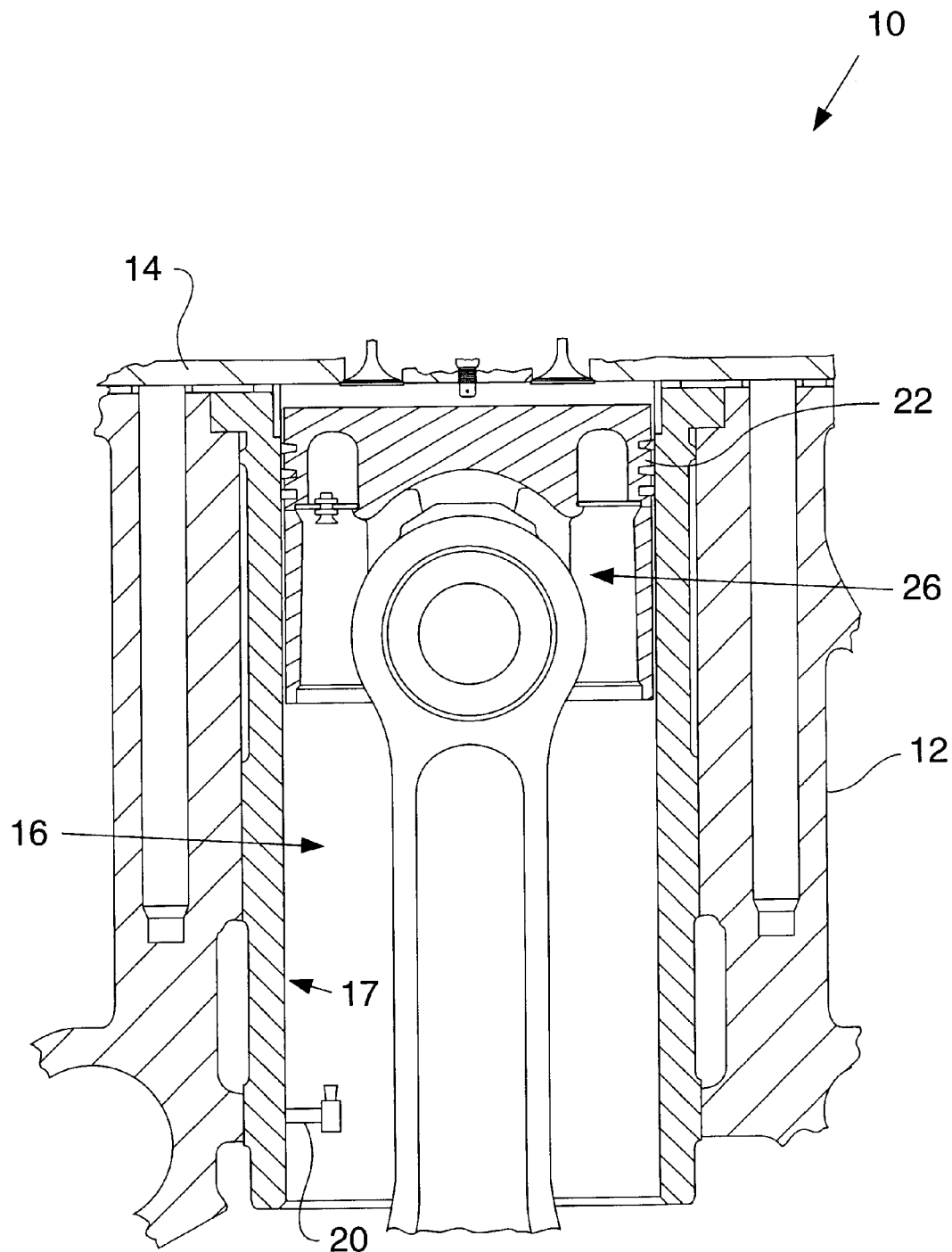
FIG. 1 shows a cross sectioned view of an engine having an embodiment of the present invention.

Referring now to FIG. 1, an internal combustion engine 10 includes an engine block 12 and a cylinder head 14 rigidly secured to the block 12 using conventional fastening mechanisms such as bolts, studs, welds, or adhesives (not shown). The block 12 has a plurality of bores 16 therein defining a cylinder wall 17, only one of which is shown. In this application a cylinder liner is be placed in the bores 16 to form the cylinder wall 17. The engine may be any conventional design such in-line, "V", or radial, and having any number of bores 16.

The engine 10 further includes a plurality of coolant and/or lubricant directing nozzles 20. In this application, oil (not shown) is used as the coolant. Each nozzle 20 is connected with the block 12 in a conventional manner such as welding, threaded connections, press fits, or integral with the block 12.

Figure 2:
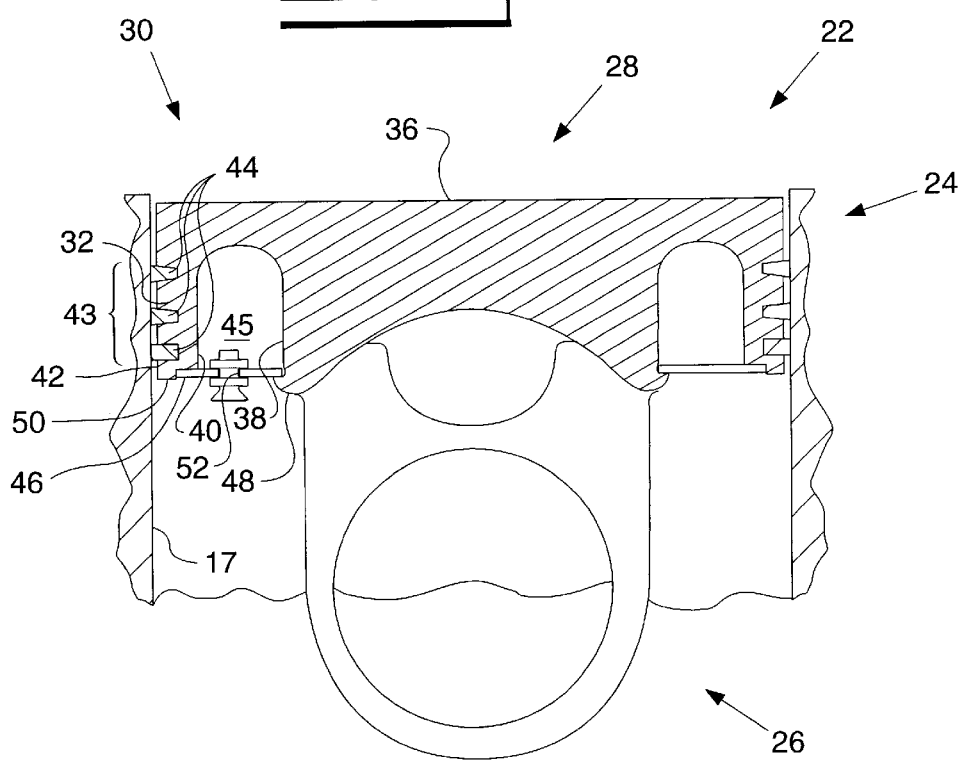
FIG. 2 shows a cross section view of a piston.

A piston 22 is slidably positioned within the cylinder wall 17. A combustion zone 27 is defined by the piston 22, the cylinder wall 17, and the cylinder head 14. FIG. 2 shows the piston 22 as a generally cylindrical structure having an upper portion 24 and a pin portion 26. In this application, the piston 22 is shown as one piece. However, the piston may be any conventional piston type including an articulated piston.

The upper portion 24 is further defined by a central portion 28, a periphery portion 30, and an outer annular wall 32. In this application, the central portion 28 has a combustion surface 36. While the central portion 28 is shown as concave, the central portion may be generally flat or convex. An inner annular portion 34 extends towards the pin portion 26. The inner annular portion 34 has an inner surface 38 facing the outer annular wall. In this application, the periphery portion 30 and central portion are integral. The outer annular wall 32 extends axially away from the periphery portion 30 towards the pin portion 26 and is generally parallel with the cylinder wall 17. The outer annular wall 32 has an inner surface 40 and an outer surface 42. The outer surface 42 has a sealing portion 4e that may be adapted to any conventional manner of providing sealing between the piston 22 and the cylinder wall 17 such as a plurality of seal rings 44. A closed cooling gallery 45 is formed between the inner surface 38 of the inner annular portion 34 and the inner surface 40 of the outer annular wall 32.

A first baffle plate 46 is connected between a lower edge portion 48 on the inner surface 38 of the inner annular portion 34 and a lower edge portion 50 of the inner surface 40 of the outer annular wall 32. The first baffle plate 46 has a receiving groove 52 proximate a first end portion 54. In this application the lower edge portion 48 of the inner surface 38 forms a lip. However, the first baffle plate 46 may be connected between the lower edge portions 48 and 50 using any conventional manner such as welding, press fit, or adhesives. The first baffle plate 48 may be made of any conventional material including ceramic, metal, polymer, or any material capable of withstanding vibrations, temperatures, pressures, and chemical interactions present in areas away from the combustion zone.

Figure 3:
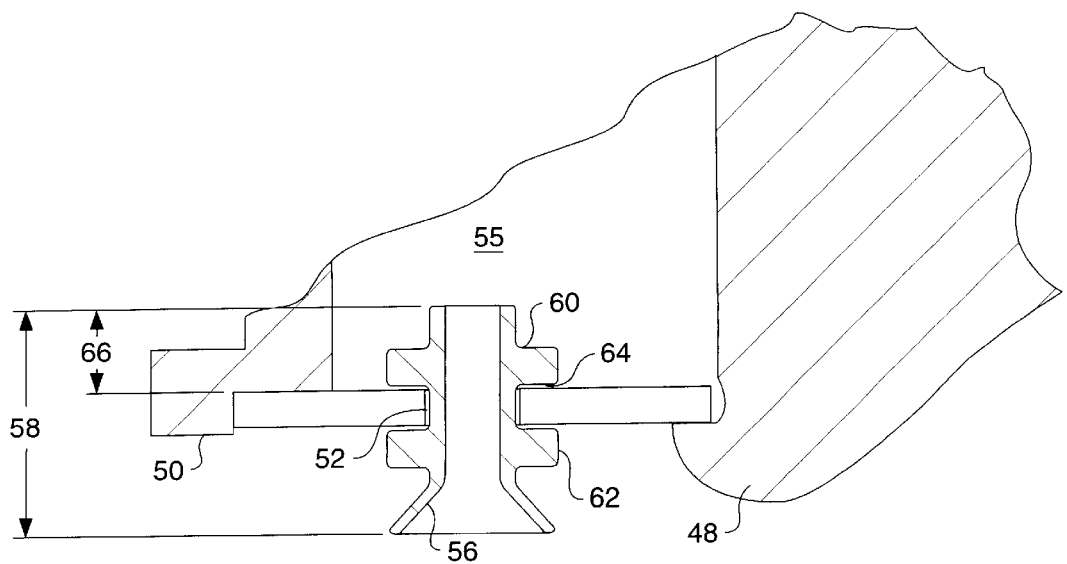
FIG. 3 shows section view of a standpipe in the piston.

FIG. 3 shows a generally cylindrical standpipe 56 of a predetermined length 58. While this application shows the standpipe 56 as funnel shaped other shapes such as conical, rectangular, and circular may be used. The standpipe 56 has a first sealing band 60 and a second sealing band 62 defining a sealing groove 64. The sealing groove 64 is positioned in the receiving groove 52 such that a second predetermined length 66 of the standpipe 56 extends into the closed cooling gallery 45. This application shows the standpipe 56 as ovular, but any conventional shape standpipe will work. The standpipe 56 is made of a metallic material such as formed steel, but a plastic or ceramic material may also be used.

In FIG. 4, a second baffle plate 68 connects between the lower edge portions 48 and 50. The second baffle plate 68 has a receiving groove 70 proximate a first end portion 72. The receiving groove 70 of the second baffle plate 68 connects with the sealing groove 64 and may be made of any material capable of withstanding vibrations, temperatures, pressures, and chemical interactions present in areas away from the combustion zone. In this embodiment, the first baffle plate 46 and second baffle plate 68 abut each other about 180 degrees from the standpipe 56. Alternatively, additional baffle plates may also be used so long as a first baffle plate 46 and second baffle plate 68 secure the standpipe 56 above the coolant supply jet 20. Similarly the second baffle plate 68 may be attached to the inner surfaces 38 and 40 in any conventional manner such as welding, adhesive, or press fit. The second baffle plate may use any material used in the construction of the first baffle plate 46. A closed cooling gallery 69 is formed between the inner annular portion 34, the annular wall 32, and the pair of baffle plates 46, 48.

FIG. 5 shows an alternative embodiment having a drain hole formed by a second receiving groove 74 of the first baffle plate 46' and a second receiving groove 76 of the second baffle plate 68' located 180 degrees from the standpipe 56'. In this application a drain pipe 73 connects between the second receiving grooves in generally the same fashion as the standpipe 56.

INDUSTRIAL APPLICABILITY

Installation of the standpipe 56 in this application is simplified and provides improved reliability. The first baffle plate 46 may be installed between the inner surface 48 of the inner annular portion 34 and lower edge 50. The sealing groove 64 on the standpipe 56 is then inserted into the receiving groove 70 on the first baffle plate 46. The sealing groove 64 and receiving grooves 52, 70 have close tolerances. However, the standpipe 56 allows movement of the first baffle plate 46. Installing the standpipe 56 after the first baffle plate 46 reduces problems associated with clearance between the standpipe 56 and ring belt portion 50 present with a pre-installed standpipe. The second baffle plate 68 is then installed similar to the first baffle plate 46.

Once the piston 22 including the standpipe 56 is installed in the engine 10, the standpipe 56 in the first embodiment allows coolant from the oil jet 20 to enter the closed cooling gallery 45. The second predetermined length 66 prevents coolant from exiting the closed cooling gallery 45 through the standpipe 56 until coolant levels in the closed cooling gallery 45 exceed the second predetermined length 66. However, generally coolant may escape from gaps between the first baffle plate 46 and second baffle plate 68 or other fits between the baffle plates 46, 68 and the inner surface 48 or lower edge portion 50.

In the alternate embodiment, the drain pipe 73 may further control egress of coolant from the closed cooling gallery 45. The second receiving grooves 74, 76 on the first baffle plate and second baffle plate further limit leakage between first baffle plate 46 and second baffle plate 68.

Other aspects, objects, and advantages of this invention can be obtained from a study of drawings, the disclosure, and the appended claims.

What is claimed is:

1. An internal combustion engine comprising:
   an engine block defining a bore;
   a cylinder head connected with said engine block; and
   a piston positioned in said bore, said piston having a first baffle plate and a second baffle plate extending between an inner annular portion and an outer annular wall, said piston having a standpipe positioned between said first baffle plate and said second baffle plate.

2. The internal combustion engine as set out in claim 1 wherein said standpipe being positioned between a first receiving groove on said first baffle plate and a second receiving groove on said second baffle plate.

3. The internal combustion engine as set out in claim 1 including a drain hole between said first baffle plate and said second baffle plate.

4. The internal combustion engine as set out in claim 3 including a drain pipe positioned in said drain hole.

5. The internal combustion engine as set out in claim 1 wherein said first baffle plate and said second baffle plate are press fit between said inner annular portion and said outer annular wall.

6. The internal combustion engine as set out in claim 1 wherein said piston having a closed cooling gallery.

7. The internal combustion engine as set out in claim 6 wherein said closed cooling gallery extends between said inner annular portion, said outer annular wall, and said first baffle plate and said second baffle plate.

* * * * *